(12) United States Patent
Delaney, Jr. et al.

(10) Patent No.: US 12,090,509 B2
(45) Date of Patent: Sep. 17, 2024

(54) COATING COMPOSITIONS AND RELATED DEVICES AND METHODS

(71) Applicant: Boston Scientific Scimed, Inc., Maple Grove, MN (US)

(72) Inventors: Joseph T. Delaney, Jr., Minneapolis, MN (US); John Kummailil, Warwick, RI (US); Paul V. Grosso, Maple Grove, MN (US); Yen-Hao Hsu, Shrewsbury, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 18/054,188

(22) Filed: Nov. 10, 2022

(65) Prior Publication Data

US 2023/0149974 A1     May 18, 2023

Related U.S. Application Data

(60) Provisional application No. 63/263,971, filed on Nov. 12, 2021.

(51) Int. Cl.
*B05D 1/18*     (2006.01)
*B05D 1/02*     (2006.01)

(52) U.S. Cl.
CPC ............. *B05D 1/18* (2013.01); *B05D 1/02* (2013.01); *B05D 2202/00* (2013.01)

(58) Field of Classification Search
CPC ................................................ B05D 2202/00
See application file for complete search history.

(56) References Cited

U.S. PATENT DOCUMENTS 6,365,557 B1 *   4/2002   Karol ............... C10M 145/34
                                                        508/274
6,489,484 B1 *  12/2002   Karol ............... C10M 135/36
                                                        508/274

(Continued)

FOREIGN PATENT DOCUMENTS

| EP | 2947123 A1 | 11/2015 |
| WO | 0129155 A2 | 4/2001 |
| WO | 0129156 A2 | 4/2001 |

OTHER PUBLICATIONS

International Search Report and Written Opinion in International Application No. PCT/US2022/079602, dated Mar. 27, 2023 (10 pages).

*Primary Examiner* — Nathan T Leong
(74) *Attorney, Agent, or Firm* — Bookoff McAndrews, PLLC

(57) ABSTRACT

Methods of treating a substrate, e.g., forming a coating on the substrate, are described. The method may include applying a solution comprising a multifunctional molecule or a multifunctional-polymer molecule to at least a portion of a surface of the substrate. The surface may comprise a metal or metal alloy and the multifunctional molecule or a multifunctional-polymer molecule may bond to the surface via at least one sulfur group of a plurality of sulfur groups of the multifunctional molecule. The method may include combining the multifunctional molecule with a polymer molecule to form the multifunctional polymer molecule before or after applying the solution. The polymer molecule may bond to an internal carbon group or a terminal sulfur group of the multifunctional molecule.

15 Claims, 5 Drawing Sheets

(56) References Cited

U.S. PATENT DOCUMENTS 7,601,280 B2 10/2009 Kinlen
8,691,028 B2 4/2014 Kendig et al.
10,577,507 B2 3/2020 Morris

* cited by examiner

COATING COMPOSITIONS AND RELATED DEVICES AND METHODS

CROSS-REFERENCE TO RELATED APPLICATION(S)

This application claims the benefit of priority from U.S. Provisional Application No. 63/263,971, filed on Nov. 12, 2021, which is incorporated by reference herein in its entirety.

TECHNICAL FIELD

This disclosure relates generally to coating compositions that may be applied onto a substrate, such as a medical device, e.g., the substrate comprising a metal or metal alloy. For example, the disclosure includes compositions useful as a coating for devices, and methods of treating a substrate.

BACKGROUND

Medical devices may experience some level of deterioration due to moisture, or lack thereof, particularly with respect to metal components of such devices. For example, fluids may cause corrosion of metal surfaces over time. Corrosion may lead to a number of medical device malfunctions. In other instances, excess dryness due to a lack of moisture or lubrication may result in other forms of deterioration, e.g., pilling and/or flaking. Imparting corrosion resistance or lubricity to medical devices may enable using less expensive metals/metal alloys, thereby saving on costs, and also widen the materials that may be used.

SUMMARY OF THE DISCLOSURE

The present disclosure includes, for example, a method of treating a substrate comprising applying a solution comprising a multifunctional molecule or a multifunctional-polymer molecule to at least a portion of a surface of the substrate, wherein the surface comprises a metal or metal alloy and the multifunctional molecule or a multifunctional-polymer molecule bonds to the surface via at least one sulfur group of a plurality of sulfur groups of the multifunctional molecule, and combining the multifunctional molecule with a polymer molecule to form the multifunctional-polymer molecule before or after applying the solution, wherein the polymer molecule bonds to an internal carbon group or a terminal sulfur group of the multifunctional molecule, and wherein the multifunctional-polymer molecule forms a coating bonded to the at least a portion of the surface.

In at least one example, the plurality of sulfur groups of the multifunctional molecule or the multifunctional-polymer molecule comprises at least one thiadiazole group or dithiazole group. In at least another example, the multifunctional molecule comprises 2,5-dimercapto-1,3,4-thiadiazole or a derivative thereof. In another example, applying the solution to the surface comprises selective deposition or stamping, thereby forming a textured surface. In at least another example, the polymer molecule is hydrophilic or hydrophobic, and the polymer molecule comprises a terminal thiol group or a terminal methane sulfonate group. In at least another example, the polymer molecule is bonded to the multifunctional molecule after applying the solution to the at least a portion of the surface.

According to some aspects herein, the method may further comprise preparing the solution by combining the multifunctional molecule with a polar solvent and a deprotonating additive. In at least one example, the multifunctional molecule comprises a polybutadiene chain. In at least another example, the polymer molecule is bonded to an internal carbon of the polybutadiene chain of the multifunctional molecule. In some examples, the polymer molecule may bond to the multifunctional molecule before applying the solution to the at least a portion of the surface. Preparing the solution may include combining the multifunctional molecule with a polar solvent, a deprotonating additive, and the polymer molecule, wherein the polymer molecule bonds to a terminal sulfur group of the multifunctional molecule. The deprotonating additive may be sodium hydroxide.

According to some aspects herein, the method may further comprise heating the solution-applied at least a portion of the surface prior to bonding the polymer molecule to the multifunctional molecule. The method may further comprise treating the surface with a plasma or heat before applying the solution to the at least a portion of the surface. In some examples, the substrate is a medical device.

The present disclosure also includes a substrate comprising a coating, wherein the substrate comprises a metal or metal alloy, and the coating comprises a multifunctional-polymer molecule formed by bonding a multifunctional molecule to a polymer molecule, the multifunctional molecule including a plurality of sulfur groups and the polymer molecule bonded to an internal carbon group or a terminal sulfur group of the multifunctional molecule, wherein at least one sulfur group of the plurality of sulfur groups is bonded to a surface of the substrate. The multifunctional molecule may comprise at least one thiadiazole group or dithiazole group. For example, the multifunctional molecule comprises 2,5-dimercapto-1,3,4-thiadiazole or a derivative thereof. In some examples, the polymer molecule is hydrophobic or hydrophilic.

The present disclosure also includes a medical device comprising a metal surface, and a coating over at least a portion of the metal surface, wherein the coating comprises a multifunctional-polymer molecule formed by bonding a multifunctional molecule to a polymer molecule, the multifunctional molecule comprising a plurality of sulfur groups and the polymer molecule bonded to an internal carbon group or a terminal sulfur group of the multifunctional molecule, wherein at least one sulfur group of the plurality of sulfur groups is bonded to the metal surface, and wherein the coating is hydrophobic or hydrophilic.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±5% in a stated value or characteristic.

Embodiments of this disclosure may address one or more limitations in the art. The scope of the disclosure, however, is defined by the attached claims and not the ability to solve a specific problem. The disclosure includes coatings that may be applied to various substrates, including surfaces comprising a metal or metal alloy, and methods of applying the coating. Exemplary substrates include medical devices, such as guidewires, stents, drainage catheters, pacemaker leads, bone pins, staples, etc., as well as other devices including injection molding tools, extrusion dies, etc. The coatings herein may impart desired properties or characteristics to the substrate, based on the composition of the coatings. Thus, some examples of coatings herein may be hydrophilic, e.g., suitable for environments in which it is desirable to retain moisture at the surface, and some other examples of coatings herein may be hydrophobic, e.g., suitable for environments in which it is desirable to repel moisture, such as to provide corrosion resistance. The coatings herein may provide other properties, such as, e.g., antibody detection, radio-opacity, antifouling, antibacterial, contact-killing bacteria, etc.

The compositions herein may be applied to a substrate to provide a coating on at least a portion of a substrate or may entirely cover the surface of a substrate.

Figure 1A:
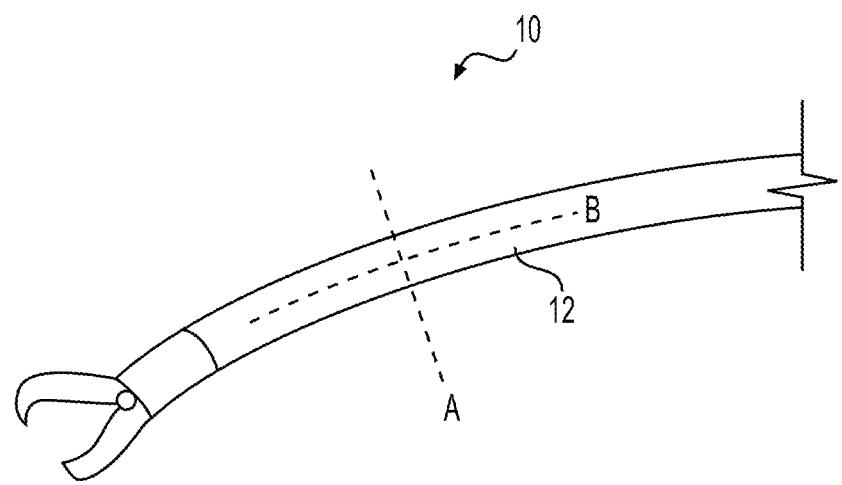
FIG. 1A is a perspective view of a medical device, according to aspects of the present disclosure.
Figure 1B:
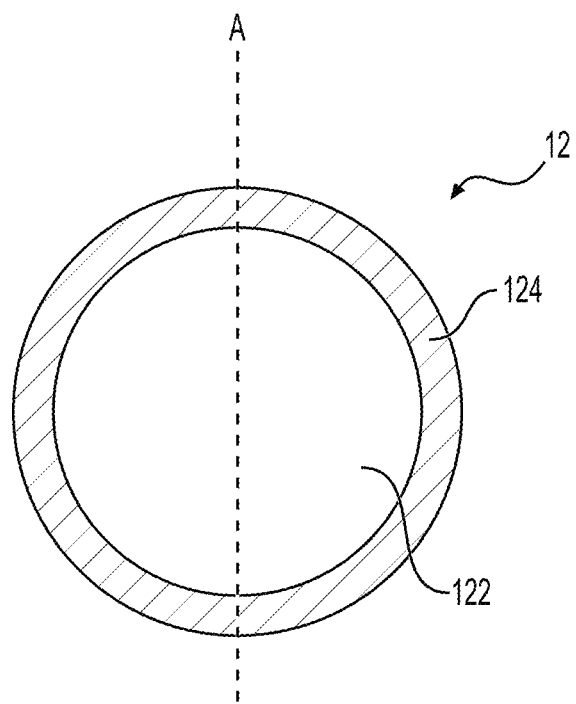
FIGS. 1B-1C are cross sectional views of a portion of the medical device of FIG. 1A.
Figure 1C:
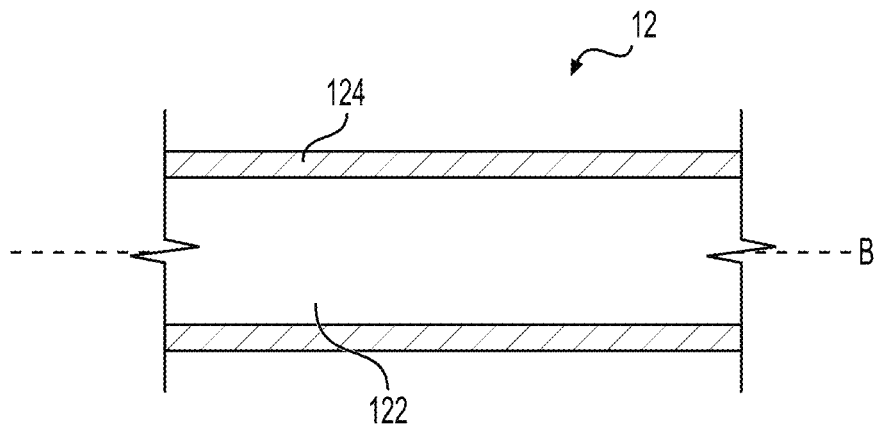

FIGS. 1A-1E depict an exemplary substrate, e.g., a medical device 10. As shown in FIGS. 1A-1C, device 10 includes a shaft 12, which includes a wall 122, which may comprise a metal or a metal alloy, and a coating 124 covering an entire surface of wall 122. In some examples, coating 124 may be applied to only part of the surface of a substrate, e.g., part(s) or section(s) of the surface of wall 122.

Figure 1D:
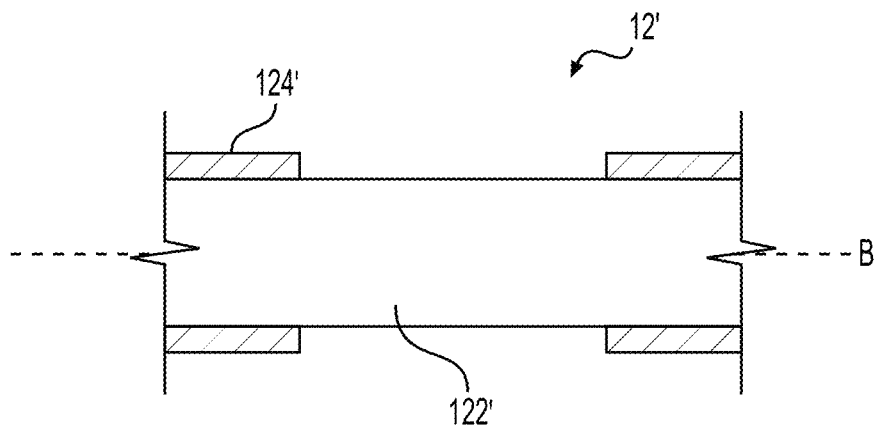
FIG. 1D is a cross sectional view of a portion of a medical device according to some aspects of the present disclosure.
Figure 1E:
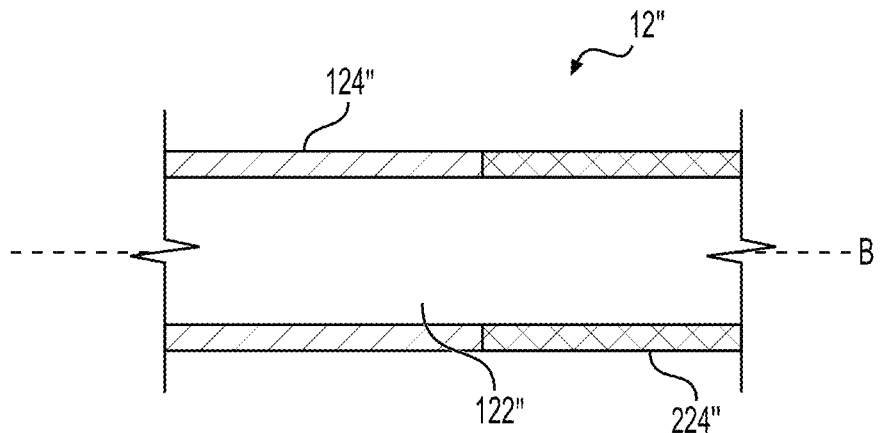
FIG. 1E is a cross sectional view of a portion of a medical device according to some aspects of the present disclosure.

FIG. 1D, for example, depicts another shaft 12' of a medical device, wherein the shaft 12' includes a coating 124' applied to various portions of a wall 122', so that certain regions of shaft 12' may be functionalized with desired properties provided by the coating 124', while other regions remain uncoated. Further, FIG. 1E depicts another example showing a device with multiple different coatings. As shown, the device includes a shaft 12" comprising a first coating 124" and a second coating 224" applied to the same substrate, e.g., wall 122" of shaft 12". Thus, for example, the region of shaft 12" that includes the first coating 124" may have different properties than the region(s) of shaft 12" than includes the second coating 224". For example, first coating 124" may be hydrophobic, while second coating 224" may be hydrophilic.

Thus, a substrate according to the present disclosure may have different properties, e.g., different portions or regions of shaft 12" may react differently to water, depending on the presence or absence of a coating, and the chemical characteristics of a coating. As noted above, the coatings herein may provide desired properties apart from hydrophilicity or hydrophobicity. The application of a coating or a plurality of different coatings optionally may be applied in a pattern. The coatings herein may be applied via any suitable means, including, but not limited to, deposition or stamping. Such techniques may be used to create textured surfaces. In some examples, the coatings may be applied by etching.

An exemplary coating according to aspects of the present disclosure (e.g., any of coatings 124, 124', 124", or 224"), may comprise a multifunctional molecule bonded to a polymer molecule. The multifunctional molecule may be organic, the multifunctional molecule comprising a plurality of sulfur groups. Exemplary sulfur groups may include, for example, thiol, disulfide, etc. At least one sulfur group of the plurality of sulfur groups may covalently bond to a surface of the substrate. For example, one or more sulfur groups of the multifunctional molecule may bond to a metal/metal alloy surface of the substrate.

In some examples, the multifunctional molecule may include at least one thiadiazole group and/or at least one dithiazole group. Some examples of the multifunctional molecule include 2,5-dimercapto-1,3,4-thiadiazole (DMcT), bisdimercaptothiadiazole ether (biDMcT ether), 5-epoxy 1,3,4-thiadiazole, 5-methyl-1,3,4-thiadiazole, and derivatives thereof. Without being bound by theory, it is believed that thiadiazole groups may be advantageous due to delocalization of electrons of the multifunctional molecule. For example, the five-member ring structure of thiadiazole groups may facilitate coordination with metal atoms or complexes more easily on the surface of the substrate.

As noted above, while at least one sulfur group of the multifunctional molecule may bond to the substrate, the multifunctional molecule may be available for bonding to a polymer molecule via, for example, a terminal sulfur group, an internal sulfur group, or an internal carbon group. The multifunctional molecule may serve as an anchoring group to the substrate, and may be further functionalized upon bonding to the polymer molecule.

The polymer may provide functionality to the multifunctional molecule when bonded thereto. Exemplary polymer molecules for the present disclosure include, but are not limited to polyethers, such as polyethylene glycol. In some examples, the polymer molecule may provide hydrophobicity to the coating. For, example, hydrophobic polymer molecules may include silicone-based polymers, polytetrafluoroethylene (PTFE), 2-perfluorohexyl ethyl thiol, polydimethylsiloxane (PDMS), and derivatives thereof. Further, examples of hydrophilic polymer molecules may include polyacrylates, polyethylene glycol (PEG), polyvinylpyrrolidone, polyoxazolines, polyvinyl alcohol (PVA), quaternary ammonium-functionalized polymers, and derivatives thereof. In some examples, the polymer molecule may include a terminal thiol group available to bond to the multifunctional molecule, or a methane sulfonate group available to serve as a leaving group when the polymer molecule bonds to the multifunctional molecule. Other suitable polymer molecules may provide for antibody detection, radio-opacity, antifouling, antibacterial, contact-killing bacteria, among other desired properties of a coating.

An exemplary method of applying a coating to a substrate is provided below.

In some examples, the substrate may be treated before a coating is applied or as part of the coating process. For example, the methods herein may include optionally treating a surface of the substrate, applying a solution comprising a multifunctional molecule to at least a portion of a surface of the substrate (and optionally preparing the solution before applying), and combining the multifunctional molecule with the polymer molecule, e.g., to bond the multifunctional molecule and the polymer molecule. In cases in which the surface is treated before applying the coating, the method may include wiping the surface with a suitable cleaning agent (e.g., detergent), rinsing the surface (e.g., with water), drying the surface, and/or exposing the surface to plasma or heat. For example, the plasma and/or heat may activate bonding groups, e.g., hydroxyl groups, on the substrate's surface, thereby priming such groups for covalent bonding with the sulfur groups of the multi-functional molecule. Such a treatment may precede applying the coating.

The solution may comprise at least the multifunctional molecule and a suitable solvent. As discussed further below, the solution may further comprise the polymer molecule in some cases, and/or one or more additives. The solution may be prepared by dissolving the multifunctional molecule in the solvent. The solvent may be organic and/or polar, and capable of dissolving the multifunctional molecule. Exemplary solvents include, but are not limited to, tetrahydrofuran (THF), acetone, dimethylformamide (DMF), dimethyl sulfoxide (DMSO) chloroform, and dichloromethane. In some examples, the solution also comprises a deprotonating additive, e.g., a molecule capable of deprotonating sulfur groups of the multifunctional molecule. Thus, for example, the deprotonating additive may prepare the multifunctional molecule for bonding with the substrate and/or the polymer molecule via the deprotonated sulfur group(s). Exemplary deprotonating additives suitable for the present disclosure include, but are not limited to, sodium hydroxide (NaOH), potassium hydroxide (KOH), potassium tert-butoxide (BuO-$K^+$), sodium hydride (NaH). In some examples, the solution may comprise 1 to 99 wt % of the multifunctional molecule, and 1 to 99 wt % of the solvent. The solution may comprise one or more additional additives, e.g., additives to further modify the multifunctional molecule, initiators, etc., as further discussed below. Preparation of the solution optionally may include heating the solution to assist in the dissolution of the multifunctional molecule.

The solution may be applied by a suitable technique, such as dip-coating or spray-coating. For example, at least a portion of the substrate may be dipped into the solution. The multifunctional molecule when in contact with the surface of the substrate may bond to metal(s) of the substrate via at least one sulfur group of the multifunctional molecule. In some instances, the solution-coated substrate may be heated, e.g., in an oven, blowing with heated air, etc., to prime the multifunctional molecule on the substrate surface for bonding with the polymer molecule.

The multifunctional molecule may bond to the polymer molecule before or after applying the solution to the substrate. For example, the multifunctional molecule may be combined with the polymer molecule to allow for the molecules to bond together, e.g., during preparation of the solution. The solution, including the multifunctional-polymer bonded molecule, may then be applied to a substrate subsequently thereafter. In other examples, the multifunctional molecule first is bonded to the substrate surface, and the polymer molecule subsequently bonded to the surface-bound multifunctional molecule. The polymer molecule may be combined with the surface-bound multifunctional molecule via a suitable technique such as dip-coating or spray-coating, thereby applying the coating to the substrate.

As previously noted, the multifunctional molecule may bond to the polymer molecule via, for example, a terminal sulfur group, an internal sulfur group, or an internal carbon group of the multifunctional molecule. Bonding between the multifunctional molecule and the polymer molecule may include, e.g., a radical mediated thiol-ene click reaction, reversible addition fragmentation chain transfer polymerization, or nitroxide-mediated polymerization.

Figure 2:
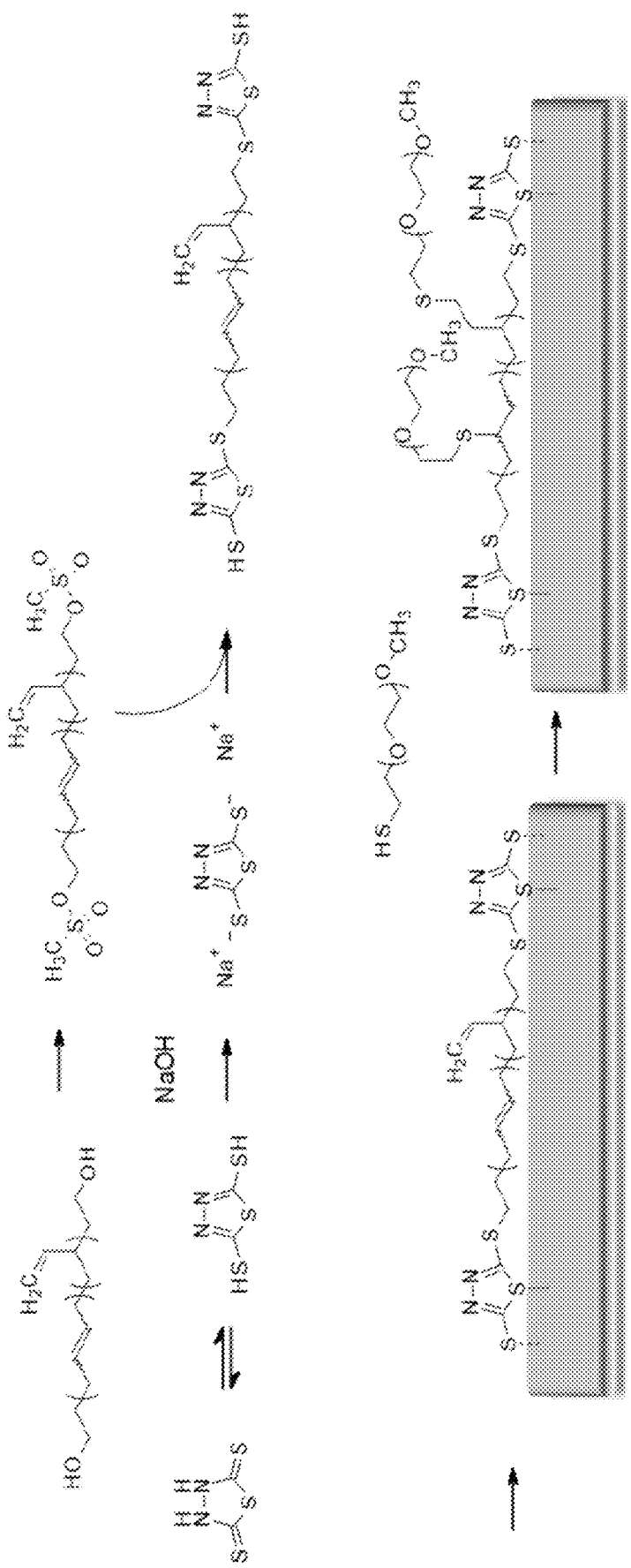
FIG. 2 shows a schematic of treating a substrate, according to aspects of the present disclosure.

An exemplary bonding of methanesulfonyl-terminated polybutadiene as the polymer molecule to DMcT as the multifunctional molecule after bonding DMcT to the surface of a substrate is shown in FIG. 2.

For example, a first solution comprising DMcT, a solvent, and sodium hydroxide may be applied to the substrate. The sodium hydroxide may serve as a deprotonating agent for the DMcT. The methanesulfonyl-terminated polybutadiene may be prepared by combining methanesulfonyl chloride with hydroxyl-terminated polybutadiene, e.g., in a suitable solvent, to react to form methanesulfonyl-terminated polybutadiene. For example, the second solution may comprise methanesulfonyl-terminated polybutadiene and the same or different solvent than the first solution. The methanesulfonyl-terminated polybutadiene may be combined with the DMcT bound to the substrate surface (e.g., by applying the second solution to the substrate), to form biDMcT ether, a DMcT-terminated polybutadiene ether bonded to the substrate as shown in FIG. 2.

Figure 3:
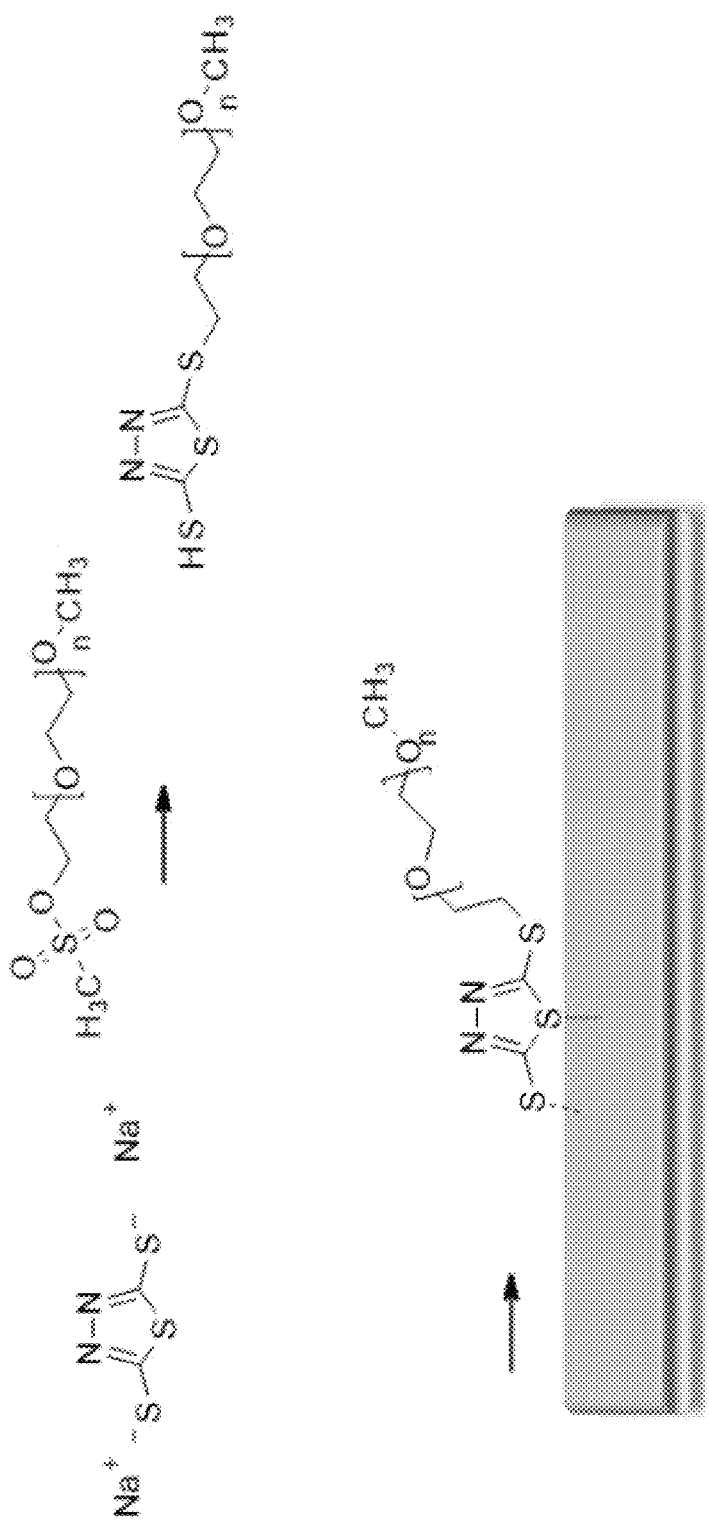
FIG. 3 shows a schematic of treating a substrate, according to some aspects of the present disclosure.

FIG. 3 shows another example whereby a polymer molecule bonds to a multifunctional molecule on a substrate surface to form a coating.

As shown in FIG. 3, DMCT as the multifunctional molecule may be combined with sodium hydroxide, e.g., in a suitable solvent, to deprotonate the DMcT, thereby forming sodium DMcT. The sodium DMcT is then combined with a methanesulfonyl-terminated polymer molecule, thereby effectuating bonding between a terminal sulfur group of the sodium DMcT and the polymer molecule. The resulting multifunctional-polymer molecule, e.g., in solution may subsequently be applied to the substrate via a suitable technique, thereby bonding the multifunctional-polymer molecule to the substrate, e.g., via sulfur groups available for bonding as shown in FIG. 3.

Figure 4:
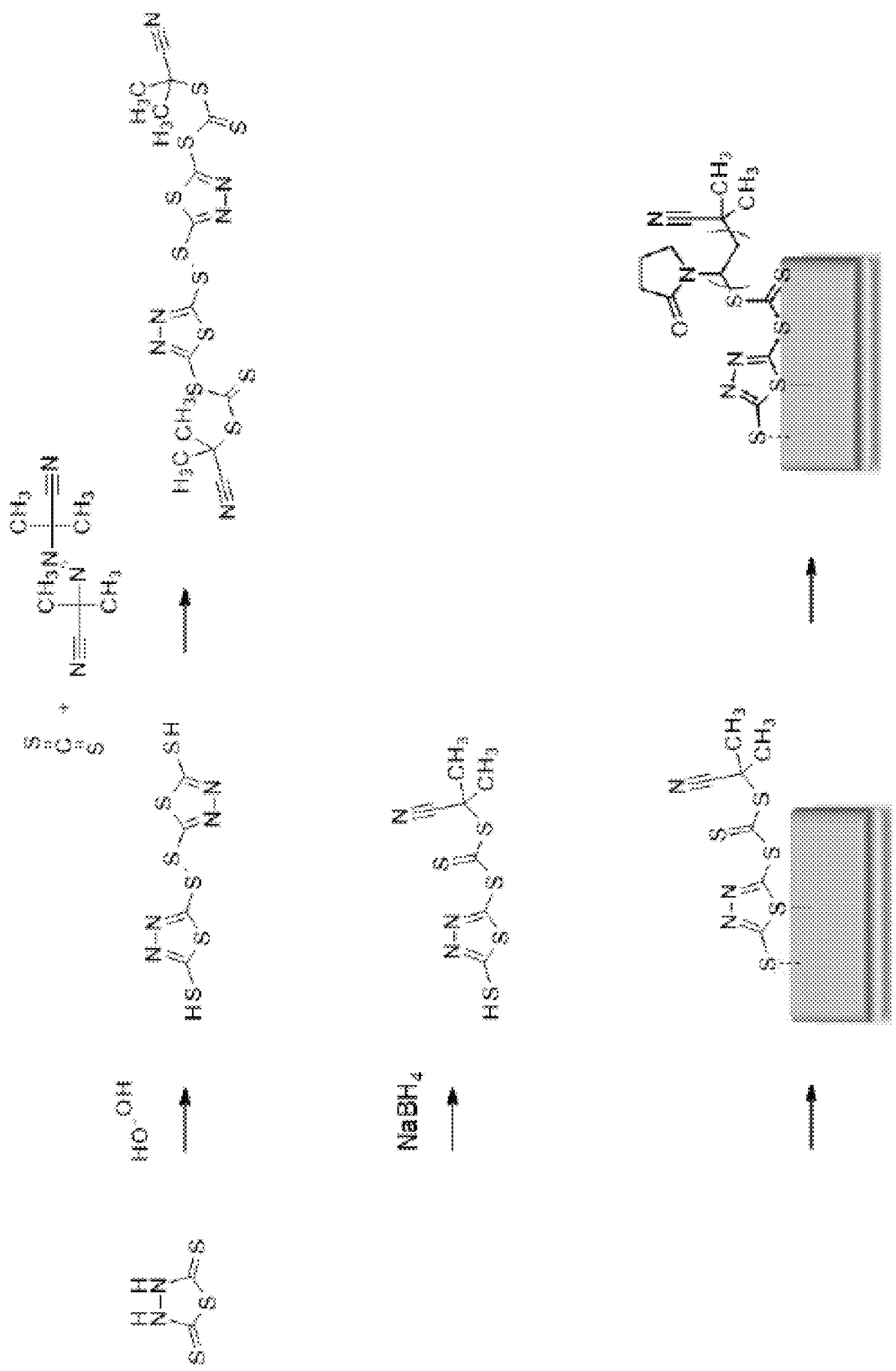
FIG. 4 shows a schematic of treating a substrate, according to some aspects of the present disclosure.

FIG. 4 shows another example, in which reversible addition-fragmentation chain-transfer (RAFT) polymerization may take place to form coating. As shown in FIG. 4, DMCT may be combined with hydrogen peroxide, e.g., in solution, and react to form a DMcT dimer including a disulfide bond. The DMcT dimer may be combined with carbon disulfide and azobisisobutyronitrile (AIBN), which may serve as a radical initiator, to form thiocarbonyl thioester-based disulfide. Sodium borohydride may be used as a reducing agent to form a terminal thiol-based thiocarbonyl thioester, as an SH-based RAFT polymerization chain transfer agent. The resulting multifunctional molecule may be applied to the substrate surface, and then bonded to grow the polymer chain by feeding monomers, thereby resulting in the surface functionalization of the substrate.

It will be apparent to those skilled in the art that various modifications and variations can be made to the present disclosure without departing from the scope of the disclosure. Other embodiments will be apparent to those skilled in the art from consideration of the specification and practice of the invention disclosed herein. It is intended that the specification, figures, and examples be considered as exemplary only, with a true scope and spirit of the invention being indicated by the following claims.

What is claimed is:

1. A method of treating a substrate, the method comprising:
    applying a solution comprising a multifunctional molecule to at least a portion of a surface of the substrate, wherein the surface comprises a metal or metal alloy and the multifunctional molecule bonds to the surface via at least one sulfur group of a plurality of sulfur groups of the multifunctional molecule; and
    adding a polymer molecule to the solution to form a multifunctional-polymer molecule before or after applying the solution to the surface, wherein the polymer molecule bonds to an internal carbon group of the multifunctional molecule or a terminal sulfur group of the multifunctional molecule;
    wherein the multifunctional-polymer molecule forms a coating bonded to the at least a portion of the surface.

2. The method according to claim 1, wherein the plurality of sulfur groups of the multifunctional molecule comprises at least one thiadiazole group or dithiazole group.

3. The method according to claim 1, wherein the multifunctional molecule comprises 2,5-dimercapto-1,3,4-thiadiazole or a derivative thereof.

4. The method according to claim 1, wherein applying the solution to the surface comprises selective deposition or stamping, thereby forming a textured surface.

5. The method according to claim 1, wherein the polymer molecule is hydrophilic or hydrophobic, and wherein the polymer molecule comprises a terminal thiol group or a terminal methane sulfonate group.

6. The method according to claim 1, wherein the polymer molecule is bonded to the multifunctional molecule after applying the solution to the at least a portion of the surface.

7. The method according to claim 6, further comprising preparing the solution by combining the multifunctional molecule with a polar solvent and a deprotonating additive.

8. The method according to claim 6, further comprising heating the solution applied to the at least a portion of the surface prior to bonding the polymer molecule to the multifunctional molecule.

9. The method according to claim 1, wherein the multifunctional molecule comprises a polybutadiene chain.

10. The method according to claim 9, wherein the polymer molecule is bonded to an internal carbon of the polybutadiene chain of the multifunctional molecule.

11. The method according to claim 1, wherein the polymer molecule is bonded to the multifunctional molecule before applying the solution to the at least a portion of the surface.

12. The method according to claim 11, wherein preparing the solution includes combining the multifunctional molecule with a polar solvent, a deprotonating additive, and the polymer molecule, wherein the polymer molecule bonds to the terminal sulfur group of the multifunctional molecule.

13. The method according to claim 12, wherein the deprotonating additive is sodium hydroxide.

14. The method according to claim 1, further comprising treating the surface with a plasma or heat before applying the solution to the at least a portion of the surface.

15. The method according to claim 1, wherein the substrate is a medical device.

* * * * *